US011129052B2

(12) United States Patent
Arvidson et al.

(10) Patent No.: US 11,129,052 B2
(45) Date of Patent: Sep. 21, 2021

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Pontus Arvidson, Sollentuna (SE); Håkan Andersson, Stockholm (SE); Per Skillermark, Årsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 328 days.

(21) Appl. No.: 16/314,739

(22) PCT Filed: Jul. 11, 2016

(86) PCT No.: PCT/SE2016/050710
§ 371 (c)(1),
(2) Date: Jan. 2, 2019

(87) PCT Pub. No.: WO2018/013019
PCT Pub. Date: Jan. 18, 2018

(65) Prior Publication Data
US 2020/0296627 A1    Sep. 17, 2020

(51) Int. Cl.
*H04W 28/08* (2009.01)
*H04W 76/28* (2018.01)
(Continued)

(52) U.S. Cl.
CPC ......... *H04W 28/0819* (2020.05); *H04W 8/24* (2013.01); *H04W 28/0835* (2020.05); *H04W 72/1215* (2013.01); *H04W 76/28* (2018.02)

(58) Field of Classification Search
CPC ............. H04W 28/0819; H04W 76/28; H04W 28/0835; H04W 8/24; H04W 72/1215;
(Continued)

(56) References Cited

U.S. PATENT DOCUMENTS

| 2014/0031040 A1* | 1/2014 | Lee ...................... H04W 76/15 455/437 |
| 2014/0213277 A1* | 7/2014 | Jang ...................... H04W 48/06 455/453 |

(Continued)

FOREIGN PATENT DOCUMENTS

| EP | 1841142 A1 | 10/2007 |
| EP | 2574112 A1 | 3/2013 |

(Continued)

OTHER PUBLICATIONS

European Communication Pursuant to Article 94(3) for European Application No. 16908967.9, dated Dec. 17, 2019—6 pages.
(Continued)

*Primary Examiner* — Charles C Jiang
*Assistant Examiner* — Shawn D Miller
(74) *Attorney, Agent, or Firm* — Sage Patent Group

(57) ABSTRACT

Embodiments herein relate to a method performed by a radio network node (12) for handling communication of data to a wireless device (10) in a wireless communication network (1). The radio network node (12) determines to transmit data associated with a first radio access technology, RAT, using a second RAT when a criterion is fulfilled, and triggers a transmission of the data to the wireless device (10) using the second RAT.

18 Claims, 14 Drawing Sheets

(51) Int. Cl.
*H04W 8/24* (2009.01)
*H04W 72/12* (2009.01)

(58) Field of Classification Search
CPC ..... H04W 88/06; H04W 88/10; H04W 48/18; H04W 28/08
See application file for complete search history.

(56) References Cited

U.S. PATENT DOCUMENTS

| | | |
|---|---|---|
| 2015/0043486 A1 | 2/2015 | Ozturk et al. |
| 2016/0050589 A1* | 2/2016 | Safavi .................. H04B 17/318 455/436 |
| 2016/0128128 A1 | 5/2016 | Ang et al. |

FOREIGN PATENT DOCUMENTS

| | | |
|---|---|---|
| EP | 2595429 A2 | 5/2013 |
| EP | 2757850 A1 | 7/2014 |
| WO | 0141488 A2 | 6/2001 |
| WO | 0141488 A3 | 12/2001 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.1.0, Sep. 2015, 1-106.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, 1-334.

* cited by examiner

RADIO NETWORK NODE, WIRELESS DEVICE AND METHODS PERFORMED THEREIN

TECHNICAL FIELD

Embodiments herein relate to a radio network node, a wireless device and methods performed therein. In particular, embodiments herein relate to for handling communication of data to and from a wireless device in a wireless communication network network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (P-GW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The data rate requirements of communication services increase quickly, e.g., to support high quality video and upcoming services like augmented and virtual reality. In parallel communication devices, like LTE smartphones and tablets, are being improved to support these sharpened requirements by including support for, e.g., larger bandwidths, multi-carrier operation, higher order MIMO, and more advanced transmitter and receiver signal processing. A consequence of these enhanced capabilities is increased power consumption.

Packet-data traffic is often highly bursty with occasional periods of transmission activity followed by longer periods of silence. In LTE, without Discontinuous Reception (DRX), the wireless device has to be awake all the time in order to decode downlink data, as the data in the downlink may arrive at any time. This means that a UE has to be monitoring PDCCH in every sub-frame in order to check if there is downlink data available. This consumes a significant part of the user equipment's power but is beneficial from a delay perspective.

In LTE a Discontinuous Reception (DRX) cycle is used to enable the wireless device to save its battery. The DRX cycle is used in Radio Resource Control (RRC) idle mode but it can also be used in RRC connected mode. Examples of DRX cycles or lengths of DRX cycles currently used in RRC idle mode are 320 ms, 640 ms, 1.28 s and 2.56 s. Examples of lengths of DRX cycles currently used in RRC connected mode may range from 2 ms to 2.56 s.

The DRX cycle is configured by a network node such as a radio network node or a core network node and the DRX cycle consists of an "on period" part and a "sleep period". During the "on period", the wireless device monitors a set of the DL channels. The set of DL channels depends on the RRC mode in which the wireless device is i.e. Connected Mode or Idle Mode. In these "on periods", the wireless device also performs measurements, e.g. intra/inter frequencies, inter-Radio Access Technology (RAT), etc, by e.g. in LTE monitoring the Primary Synchronization Signal (PSS)/Secondary Synchronization Signal (SSS) and Cell specific Reference signals (C-RS). This on period is denoted as on duration. During the on duration of the DRX cycle, a timer called 'onDurationTimer', which is configured by the network node, is running. This timer specifies a number of consecutive control channel subframes, e.g. Physical Downlink Control Channel (PDCCH), enhanced Physical Downlink Control Channel (ePDCCH) subframe(s), at the beginning of a DRX Cycle. It is also interchangeably called as DRX ON period. More specifically it is the duration in downlink subframes that the wireless device, after waking up from DRX, may receive a control channel, e.g. PDCCH or ePDCCH. If the wireless device successfully decodes the control channel, e.g. PDCCH or ePDCCH, during the ON duration then the wireless device starts a DRX inactivity timer and stays awake until its expiry. When the onDurationTimer is running the wireless device is considered to be in a DRX mode of the DRX cycle.

The DRX inactivity timer specifies the number of consecutive control channel subframe(s) after a subframe in which a control channel indicates an initial UL or DL user data transmission for this Medium Access Control (MAC) entity. It is also configured by the network node. When the DRX inactivity timer is running the wireless device is considered to be in a non-DRX mode i.e. no DRX is used. An active time is the time the duration during which the wireless device monitors the control channel, e.g. PDCCH or ePDCCH. In other words this is the total duration during which the wireless device is awake. This includes the "on-duration" of the DRX cycle, the time during which the wireless device is performing continuous reception while the DRX inactivity timer has not expired and the time the wireless device is performing continuous reception while waiting for a DL retransmission after one Hybrid Automatic Repeat Request Round-Trip Time (HARQ RTT). The minimum active time is equal to the length of an on duration, and the maximum active time is undefined (infinite). Thus, if the wireless device receives a DL message during the "on" duration, the wireless device exits its DRX cycle, starts a "DRX inactivity timer", and continuously monitors the corresponding DL channels until the timer expires.

During the "sleep period", the wireless device is not mandated to monitor the DL channels and, therefore, the wireless device cannot be reached for DL transmissions during this time.

The DRX ON and DRX OFF durations of the DRX cycle are shown in FIG. 3. The DRX operation with more detailed parameters in LTE is illustrated in FIG. 4.

Hence, in LTE, DRX functionality can be configured for both RRC_IDLE and RRC_CONNECTED wireless devices. The wireless device restarts the DRX Inactivity Timer each time the wireless device gets DL data and, when the timer expires the wireless device starts its DRX cycle again. In Connected Mode, the wireless device starts a short DRX cycle, if configured. Otherwise, the wireless device starts a long DRX cycle. If the wireless device does not receive any DL message during the "DRX short cycle timer" period, the wireless device enters the second, long, DRX cycle.

Thus, the basic mechanism for DRX is a configurable DRX cycle, which causes the wireless device to only monitor the downlink control signaling in one or a few subframes per DRX cycle, having the receiver circuitry switched off in the remaining sub-frames. This reduces power consumption but implies restrictions to the scheduler as the wireless device can only be addressed in active sub-frames and hence introduces delay. The wireless device remains in active state based on the DRX inactivity timer that is reset on each scheduling occasion and the wireless device remains awake until the timer expires and the wireless device goes back to DRX sleep state. During the DRX sleep state, the wireless device is not allowed to transmit periodic CSI or Sounding Reference Signals (SRS) so the radio network node may assign those resources to other wireless devices.

The radio network node configures DRX with a set of DRX parameters, including both short and long DRX cycles. These DRX parameters are selected based on the application type in order to maximize power and resource savings. Short DRX cycles for, e.g., VoIP is typically 20 ms, and the long DRX cycle, e.g., listening for paging information, may be as long as hundreds of radio frames. If the wireless device wants to transmit data in the uplink, the wireless device may choose to discard the current DRX cycle by initiating a Random Access Procedure.

Even though DRX makes it possible to trade-off power consumption for latency the inherently highly capable LTE technology, and the complexity associated with that, makes it difficult to obtain very low power consumption in combination with low latency downlink availability. To illustrate, LTE receivers today often need 100-200 mA (at around 3 V) to listen to paging (PDCCH) while a simple Bluetooth Low Energy (BLE) receiver needs 10-20 mA (at 3 V) to receive.

Wireless device power consumption and battery drain is a real problem that lowers the user experience resulting in a limited performance of a wireless communication network.

SUMMARY

An object of embodiments herein is to provide a mechanism for improving performance of the wireless communication network in an efficient manner.

According to an aspect the object is achieved by a method performed by a radio network node for handling communication of data to a wireless device in a wireless communication network. The radio network node determines to transmit data associated with a first radio access technology, RAT, using a second RAT when a criterion is fulfilled, and triggers a transmission of the data to the wireless device using the second RAT.

According to another aspect the object is achieved by a method performed by a wireless device for handling communication of data to a radio network node in a wireless communication network. The wireless device determines to transmit data associated with a first RAT using a second RAT when a criterion is fulfilled, and transmits the data to the radio network node using the second RAT.

According to yet another aspect the object is achieved by providing a radio network node for handling communication of data to a wireless device in a wireless communication network. The radio network node is configured to determine to transmit data associated with a first RAT using a second RAT when a criterion is fulfilled. The radio network node is further configured to trigger a transmission of the data to the wireless device using the second RAT.

According to still another aspect the object is achieved by providing a wireless device for handling communication of data to a radio network node in a wireless communication network. The wireless device is configured to determine to transmit data associated with a first RAT using a second RAT when a criterion is fulfilled. The wireless device is further configured to transmit the data to the radio network node using the second RAT.

It is furthermore provided herein a computer program comprising instructions, which, when executed on at least one processor, cause the at least one processor to carry out any of the methods above, as performed by the radio network node or the wireless device. It is additionally provided herein a computer-readable storage medium, having stored thereon a computer program comprising instructions which, when executed on at least one processor, cause the at least one processor to carry out the method according to any of the methods above, as performed by the radio network node or the wireless device.

By using the second RAT for transmitting data associated with the first RAT embodiments herein make use of the second RAT in combination with the first RAT in order to have more flexibility to configure the system for low latency communication and low power consumption at the wireless device. Embodiments herein address over-utilization, timing, delay and power consumption issues in the first RAT by redirecting, in terms of e.g. transmitting or receiving data, such as control plane signaling, triggers, and/or feedback, via the second RAT with shorter setup-time and transmission/reception delays or more favorable power consumption characteristics. This thus leads to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
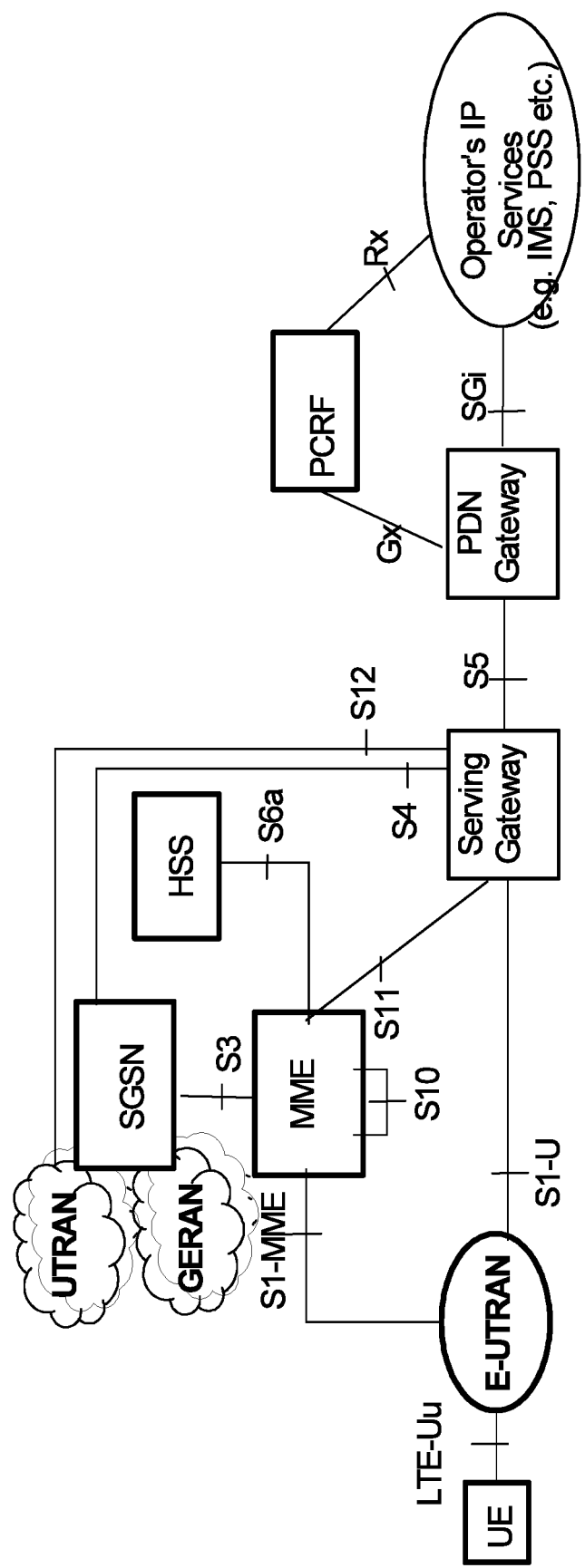
FIG. 1 is a schematic overview depicting a wireless communication network according to prior art.
Figure 2:
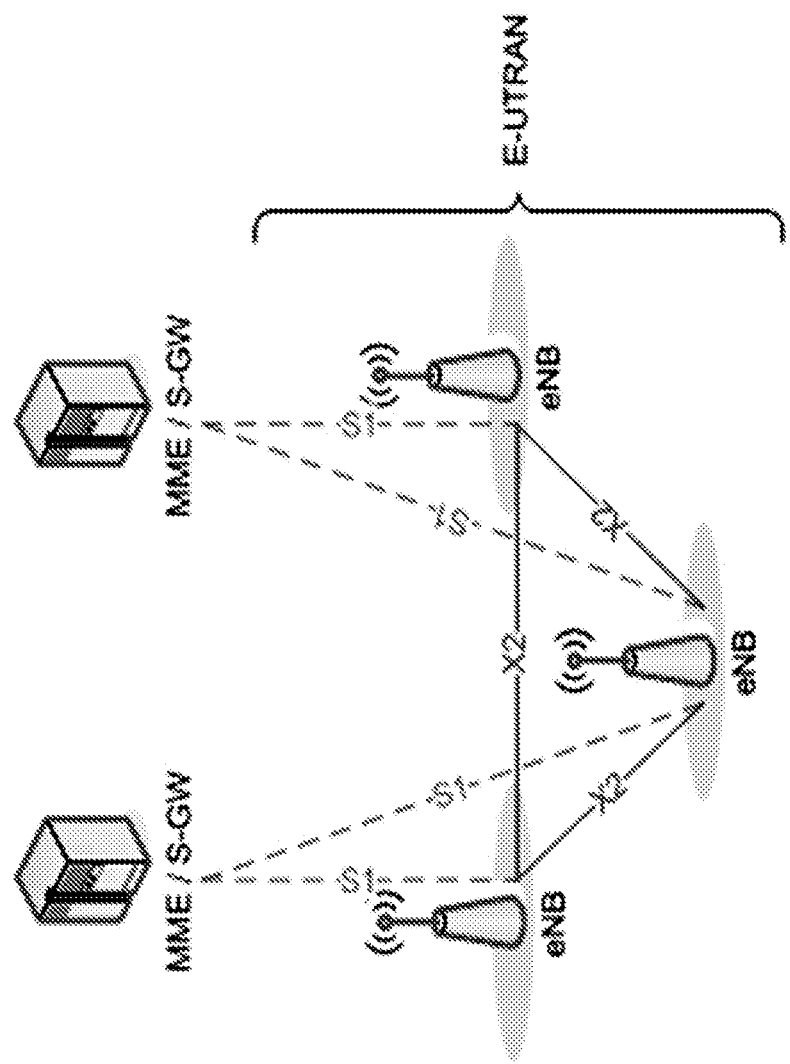
FIG. 2 is a schematic overview depicting a radio access network in connection with a core network.
Figure 3:
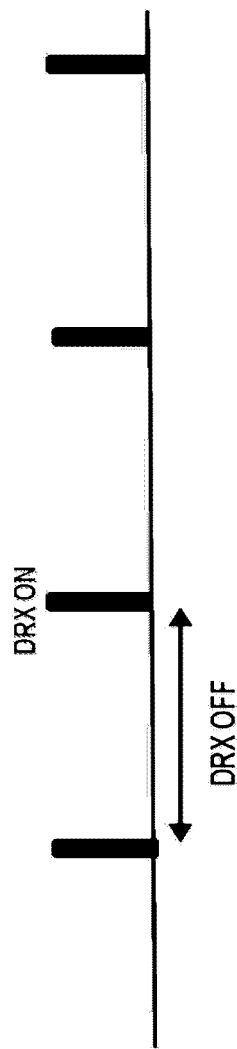
FIG. 3 is a DRX procedure with DRC cycle according to prior art.
Figure 4:
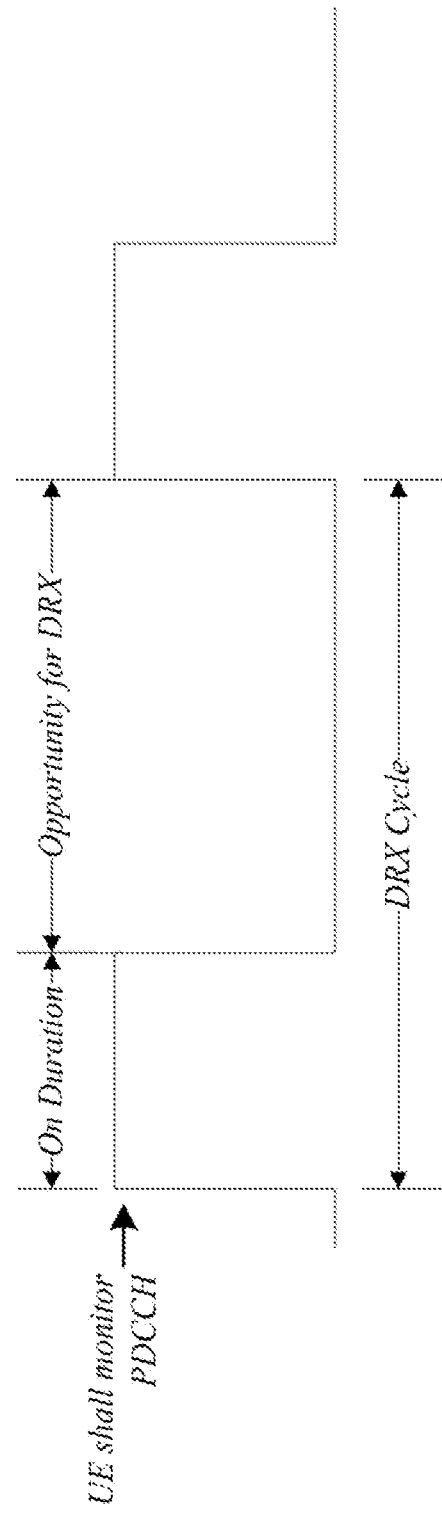
FIG. 4 is a DRX procedure with DRC cycle according to prior art.
Figure 5:
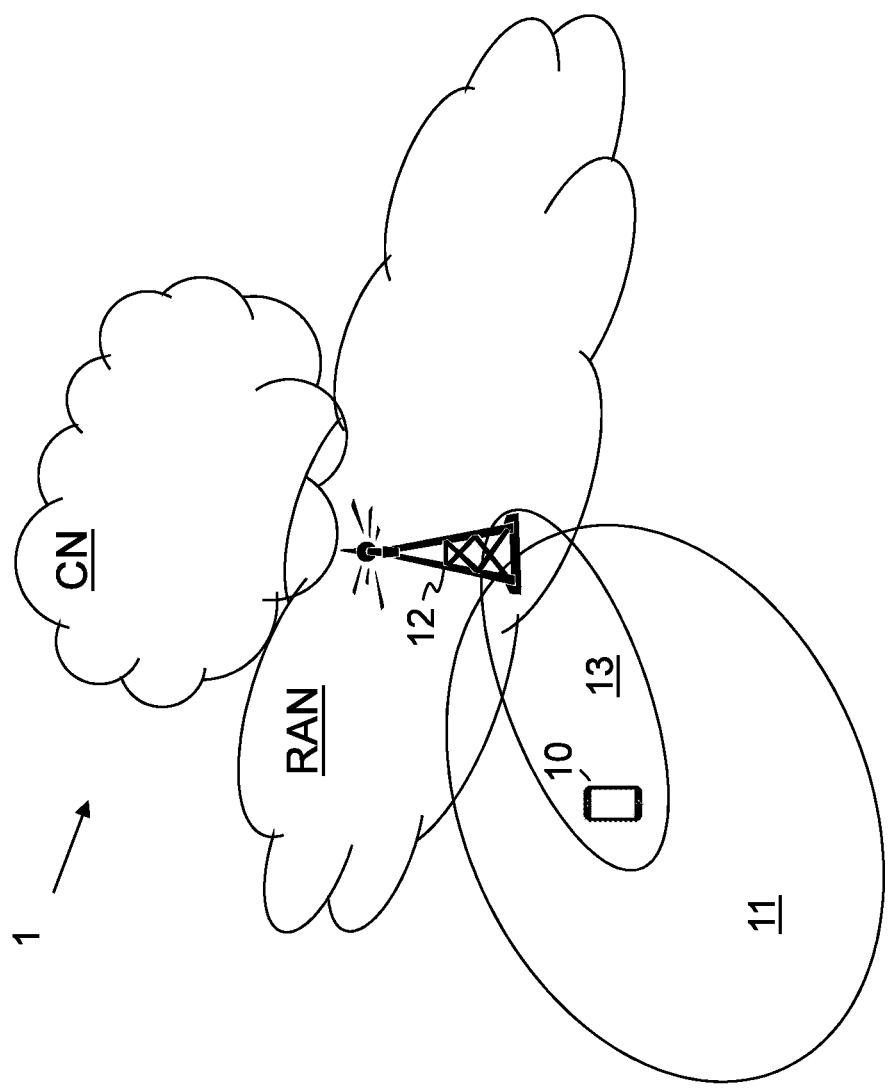
FIG. 5 is a schematic overview depicting a wireless communication network according to embodiments herein.

Embodiments herein relate to communication networks in general. FIG. 5 is a schematic overview depicting a wireless communication network 1. The wireless communication network 1 comprises one or more RANs e.g. a first RAN (RAN1), connected to one or more CNs, exemplified as a first CN (CN1). The wireless communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a wireless device 10 such as a mobile station, a non-access point (non-AP) STA, a STA, a user equipment and/or a wireless terminal, are connected via the one or more RANs, to the CN. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or any device communicating within a cell or service area.

The wireless communication network 1 comprises a radio network node 12 providing radio coverage over a geographical area, a service area 11, of a first radio access technology (RAT) or primary RAT, such as LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the first radio access technology and terminology used.

The radio network node 12 or another radio network node may provide radio coverage over a geographical area, a second service area 13, of a second RAT or secondary RAT, such as Wi-Fi, Bluetooth Low Energy (BLE) or similar. It should be noted that a service area may the denoted as 'cell', beam, beam group or similar to define an area of radio coverage.

Bluetooth Low Energy (BLE) is a low cost, low power radio technology that can be used to, for instance, gather information from sensors in an area. It operates in the un-licensed 2.4 GHz industrial, scientific and medical (ISM) band where roughly 80 MHz of spectrum is available. Compared to many other radio technologies BLE has a fast connection setup time. A wireless device can create a connection, transmit data and disconnect in just about 3 ms. It is also possible to set up and maintain persistent connections between wireless devices. During such connections, "keep alive" messages are transmitted at regular, configurable intervals—using BLE terminology a message is transmitted from a master to a slave at every new connection event, and the slave must answer to at least some of these transmissions for the connection to stay active.

BLE is hence low-cost, low power, and relatively responsive, however, the data rate is low, e.g. 1 Mbps over-the-air, making it suitable for smaller data transfers. Also, range is limited but still a range of hundred meters or even more can be supported under favorable propagation conditions. A long-range BLE mode is also expected to be available during 2016, extending the range of the BLE technology up to 4 times.

Mobile operating systems have native BLE support and most smart phones, tablets and laptop computers are already equipped with BLE chipsets. It is estimated that around 2018 90% of all Bluetooth equipped smart phones will have support for BLE. Already today, a large number of smartphones and tablets have support for both LTE and BLE, and the number is expected to increase in the future.

According to embodiments herein the radio network node 12 is equipped with a second RAT interface e.g. for providing BLE access for the wireless device 10 and thereby it is utilized that many wireless devices support both the first and second RAT, such as LTE and BLE. Embodiments herein let the second RAT, e.g. BLE, carry some of the signaling for the first RAT. Dual RAT connectivity is thus used as a complement to a single RAT access only, wherein the first RAT and second RAT are different RATs or at least the same RATs but with different configured parameters e.g. DRX parameters.

The radio network node 12 may set up a second connection of the second RAT between the radio network node 12 and the wireless device 10 and let this second connection carry control signaling for the first RAT, i.e. data associated with the first RAT, for wireless device 10 that are within both RAT coverage. When no data communication is ongoing over the first RAT, such as LTE Physical Downlink Shared Channel (PDSCH) or LTE Physical Uplink Shared Channel (PUSCH), the wireless device 10 listens to the second connection for e.g. paging while having first RAT Tx and Rx circuitry turned off. The second connection, i.e. over the second RAT, may be configured to fulfill a latency or delay requirement of the application while a DRX of the first RAT may be configured to achieve the highest possible power savings at the wireless device 10 i.e. the first RAT is configured so that a minimal energy consumption in the wireless device 10 is achieved.

By making use of dual RAT connectivity and let the second RAT carry part of the traffic or data of the first RAT, it is possible to tune the system in ways that are not possible using only the first RAT access. In this way, it is possible to find operational points that are associated with better balance between certain key performance indicators e.g. latency in relation to power consumption. For example, when the second RAT is used to carry downlink paging information of the first RAT, also known as a wake up order, when the wireless device 10 is in sleep mode of the first RAT, a better balance between latency and power consumption is achieved compared to what can be achieved when using first RAT only. Hence, for a given latency power consumption can be reduced, or, for a given power consumption latency can be reduced. In another example over utilization in the first RAT is a basis for using the second RAT, where queueing of data of wireless devices in a scheduler may make it beneficial to route some control data via the second RAT even though DRX is not utilized, thus focusing merely on reducing latency. For the user of the wireless device this leads to a better user experience and also to an improved performance of the wireless communication network in an efficient manner.

Figure 6:
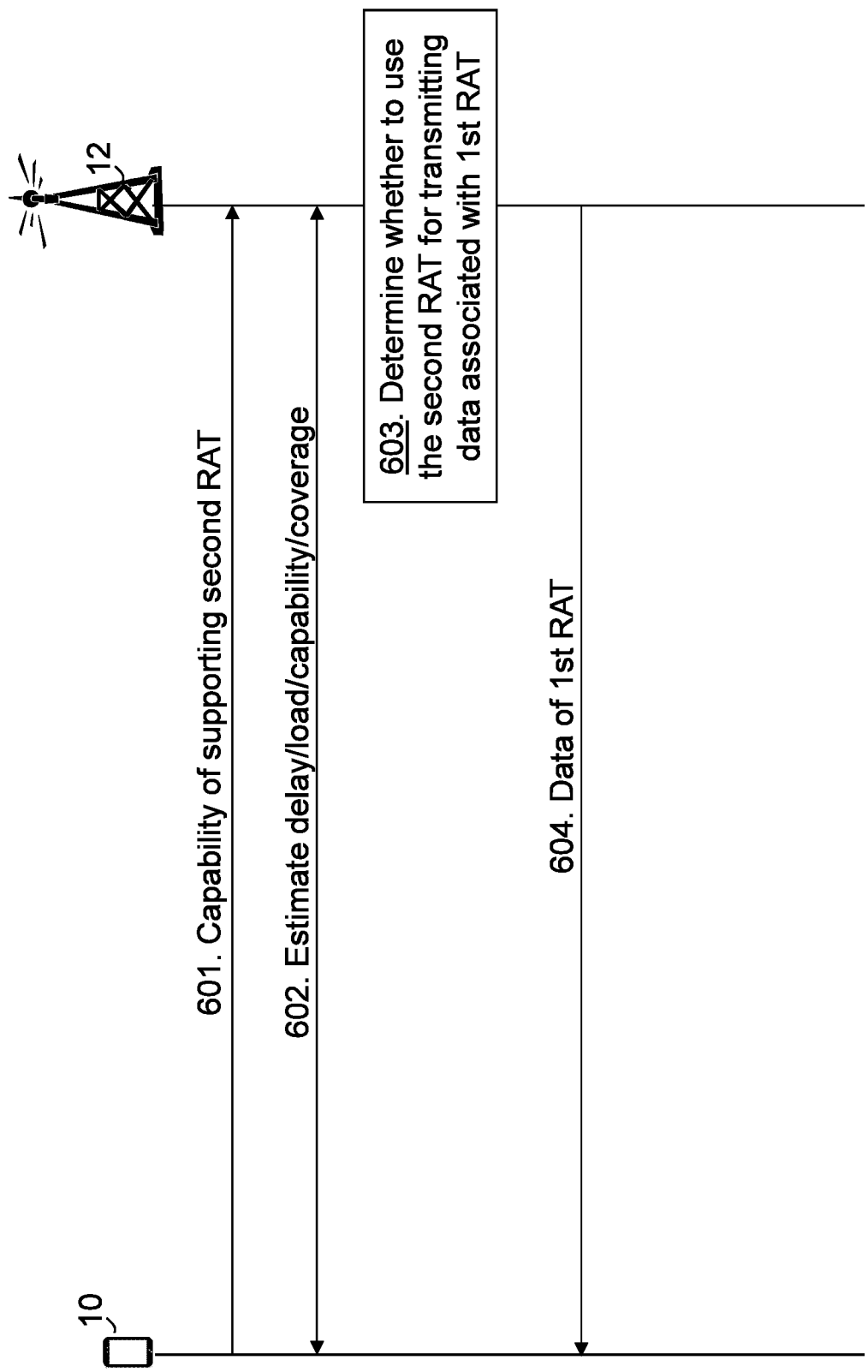
FIG. 6 is a combined flowchart and signalling scheme according to embodiments herein.

FIG. 6 is a combined method and signalling scheme according to embodiments herein.

Action 601. The wireless device 10 may report capability to the radio network node 12 informing the radio network node 12 about capability of supported RATs of the wireless device 10. The wireless device 10 may report capability of supporting receiving control information over the second RAT. E.g. the wireless device 10 may inform the radio network node 12 about its capabilities including if it supports any or the alternative second RAT, like BLE, and if it supports receiving (downlink) control information over the alternative second RAT. This information may be included in an Information element such as 'UE Capability Information' in RRC signalling.

Action 602. The wireless device 10 and the radio network node 12 may then estimate delay of the first RAT, load in the first RAT, and/or determine capability of the wireless device 10. Furthermore, the radio network node 12 may assess whether the wireless device 10 is within coverage also for the alternative second RAT.

Action 603. The radio network node 12 may then determine whether to use the second RAT for transmitting data associated with the first RAT. Embodiments herein aim to facilitate low energy consumption of the wireless device 10 and short delays of communication. Thus, the first RAT may be configured to minimize energy consumption, whereas the alternative second RAT may be configured based on the delay requirements, e.g. a normal DRX procedure and configuration of the first RAT is complemented with usage of the alternative second RAT, such as BLE. The alternative second RAT is used to transfer e.g. downlink control information during times when the wireless device 10 is in a DRX Sleep state, i.e. during times when the wireless device 10 does not monitor the PDCCH and is not reachable from the radio network node 12 over the first RAT. If the wireless device 10 does not support the second RAT, or if the range of the alternative second RAT is insufficient, the radio network node 12 may configure the first RAT, e.g. DRX parameters, according to today's state of the art procedures. However, if the wireless device 10 does support the second RAT and if the wireless device 10 is within reach also over the second RAT, the radio network node 12 when configuring the first RAT parameters may also configure the second RAT to be used for e.g. paging or similar. As examples when the second RAT is e.g. BLE, the radio network node 12 may:

Configure the wireless device 10 to monitor the second RAT advertisement channels, scanning using BLE terminology, for advertisement messages from the radio network node 12 inviting for a second RAT connection. To accomplish this, the wireless device 10 and the radio network node 12 may exchange information about BLE Medium Access Control (MAC) addresses such that the wireless device 10 and the radio network node 12 may recognize each other over the alternative BLE access. Or, the wireless device 10 and the radio network node 12 may bond, i.e., exchange keys that are stored for future use and that may be utilized by the wireless device 10 and the radio network node 12, respectively, to identify each other, when using resolvable private addresses. In BLE, keys for resolving such private addresses are referred to as Identity Resolving Keys (IRK).

Alternatively, a connection of the second RAT between the wireless device 10 and the radio network node 12 may simply be established and maintained. The connection can be established with the wireless device 10 or the radio network node 12 as a master. In some embodiments, the connection is established with the radio network node 12 as the master, meaning that it is the wireless device 10 that during connection setup advertises and it is the radio network node 12 that answer or send responses to the advertisement message, with a connection request message. Depending on, e.g., the delay requirements, energy consumption requirements of the wireless device 10, and on how many simultaneous second RAT connections the radio network node 12 supports, the connection can be established with a suitable connection interval and slave latency, as well as other suitably selected connection parameters. The connection interval defines the time between connection events—the master transmits a packet to the slave at the beginning of each connection event—and can take values between 7.5 ms and 4.0 s. The slave latency defines how many consecutive connection events the slave is not required to listen for, and respond to, the master.

Action 604. The radio network node 12 then triggers the transmission of the data associated with the first RAT, to the wireless device 10, using the second RAT and thereby achieving the objective of minimizing the energy consumption and the latency in the wireless communication network.

Figure 7:
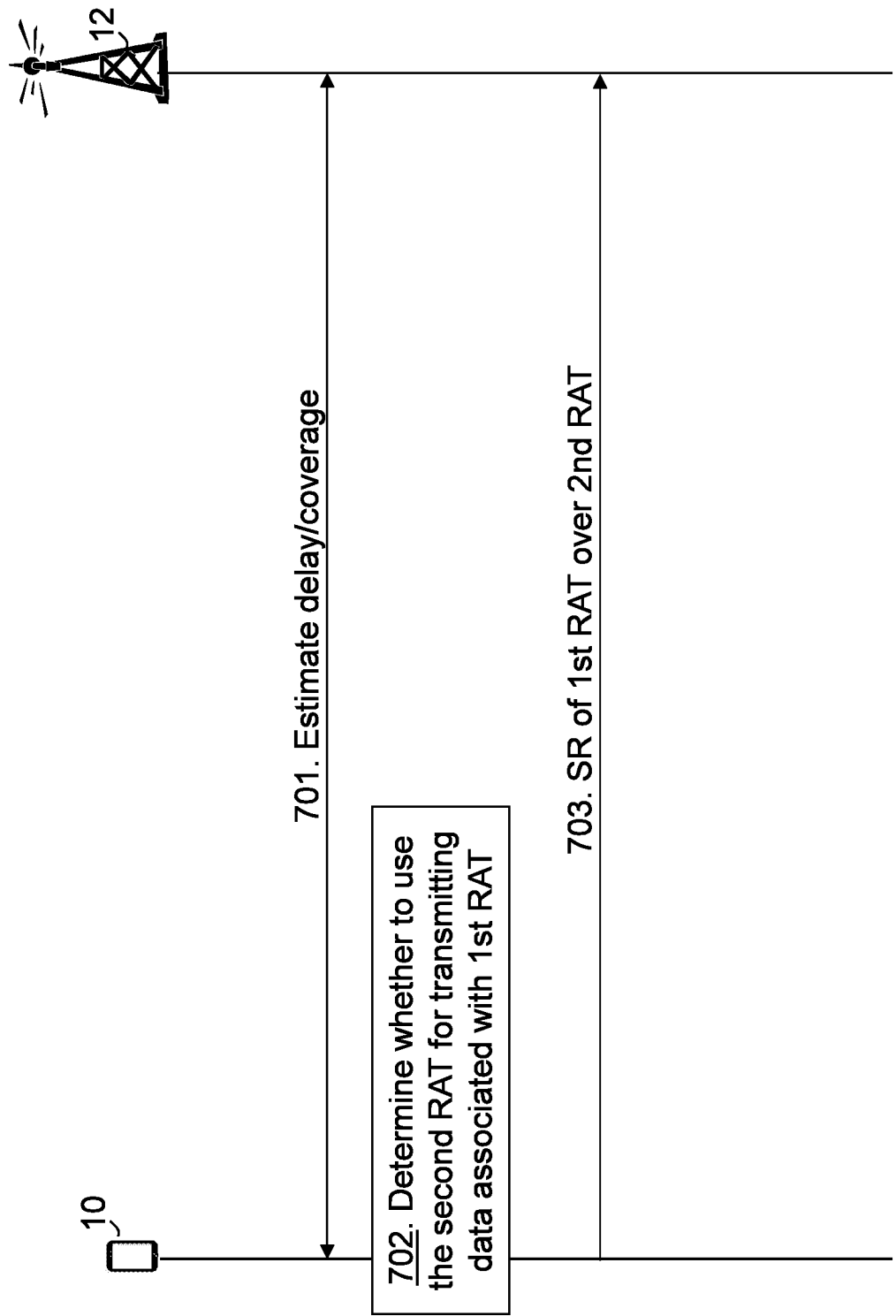
FIG. 7 is a combined flowchart and signalling scheme according to embodiments herein.

FIG. 7 is a combined flowchart and signalling scheme according to some embodiments herein. With a large number of wireless devices connected to the radio network node 12, the number of resources on the uplink control channel, e.g. PUCCH, may be a limiting factor to the number of wireless devices that may be connected simultaneously. The total number of resources can be increased by having a long periodicity for the PUCCH resources, but this has the drawback that it may introduce large delays for uplink data. The wireless device 10 is also allowed to transmit on an access channel such as the physical random access channel (PRACH) to perform a scheduling request (SR), but in many situations, especially situations with a large number of wireless devices and high mobility, this may not be a preferable solution due to PRACH congestion.

Action 701. The radio network node 12 may estimate delay of the first RAT or load in the first RAT. Furthermore, the radio network node 12 may assess whether the wireless device 10 is within coverage also for the alternative second RAT. In order to create an alternate connection of the second RAT, the wireless device 10 must first ascertain that the second RAT is available and that it is within coverage as well as receive any information necessary to create the connection of the second RAT, such as addressing (71). The second service area 13 of the second RAT is typically expected to be smaller than the first service area 11 of the regular RAT. The access points of the first and second RAT may also be either co-located or located at separate locations, e.g. using a remote radio unit or similar. It is therefore not certain that the wireless device 10 is always within coverage of both RATs.

One such alternative is that the radio network node 12 supplies necessary information in the system information blocks (SIB) which are broadcasted to all wireless devices in the first service area 11. Such information may comprise addressing information and/or measurement instructions for which cells of the second RAT to measure on when the wireless device 10 determines whether second RAT coverage is available based on its own channel measurements. The wireless device 10 may then make necessary calculations to determine whether second RAT coverage is available based on its own channel measurements, given that the access point of the second RAT is co-located with the radio network node 12 of the first RAT. Another alternative is that the radio network node 12 transmits beacon messages using the second RAT. If the wireless device 10 can receive the beacons, it may be assumed that there is sufficient coverage to create a connection using the second RAT. A third option is to configure the second RAT using procedures that may be introduced in the Radio Resource Control (RRC) layer of the first RAT.

Action 702. The wireless device 10 may then determine whether or not to use the second RAT for data associated with the first RAT. E.g. the wireless device 10 may estimate the total delay, using the first RAT, for the data it wishes to send (72), and then use the second RAT if the estimated delay exceeds a configured threshold (73).

Action 703. The wireless device 10 may then be allowed to setup an additional connection, using the second RAT, to the base station to transmit its scheduling request. In the case where the second RAT is BLE this means that the wireless device 10 may start transmitting advertising messages to the radio network node 12 in order to set up a connection, and once the connection is created the wireless device transmit its scheduling request for the first RAT using a data channel of the second RAT. Once the scheduling request is received the connection of the second RAT may be terminated. To ensure that the communication can be performed in a secure manner, the native encryption of second RAT such as BLE may be utilized. Necessary keys may be derived from parameters of the existing connection of the first RAT.

In another example, a high amount of user plane data feedback transmissions may limit the achievable data rate, especially when the radio network node 12 is limited by user-multiplexing capabilities in the control plane. Some types of user data, Transmission Control Protocol (TCP) acknowledgements (ACK) packets in particular, are small in size and benefit from decreased transmission delays since the achievable data rate is tightly coupled to the round-trip-time (RTT), which affects the adaptive congestion window size. The wireless device 10 may, in a manner similar to what is described in above, choose to transmit these feedback messages over the second RAT and thereby achieving the objective of minimizing the energy consumption and the latency in the wireless communication network.

Figure 8:
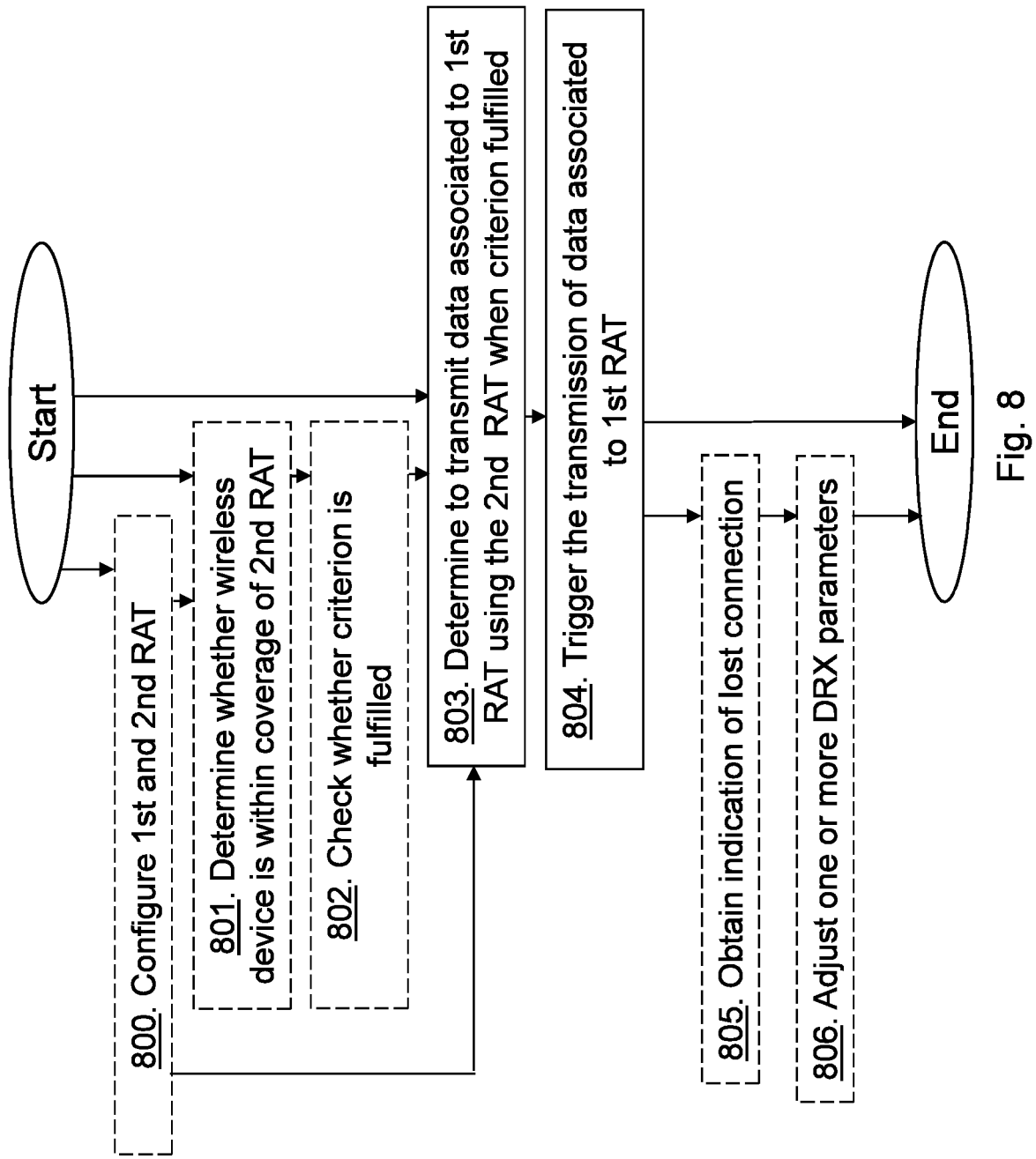
FIG. 8 is a schematic flowchart depicting a method performed by a radio network node according to embodiments herein.

The method actions performed by the radio network node 12 for handling communication of data to the wireless device 10 in the wireless communication network 1 according to some embodiments will now be described with reference to a flowchart depicted in FIG. 8. The actions do not have to be taken in the order stated below, but may be taken in any suitable order. Actions performed in some embodiments are marked with dashed boxes and are optional. The first RAT may use a licenced frequency band and the second RAT may use an unlicensed frequency band. Furthermore, the wireless device 10 may consume less energy per time unit using the second RAT than using the first RAT. The first RAT may e.g. comprise LTE access or 5G access and second RAT may comprise Bluetooth Low Energy access. The data may be control data regarding a transmission using the first RAT, e.g. the data may be a wake up order to the wireless device 10 for receiving data over the first RAT such as a paging message, or a feedback data of data transmitted from the wireless device 10 to the radio network node 12 such as an Acknowledgement (ACK) or a non-Acknowledgement (NACK).

Action 800. The radio network node 12 may configure the first RAT for a minimal energy consumption in the wireless device 10, and the second RAT to fulfill a delay requirement. For example, the first RAT may be configured with a long DRX cycle, e.g. with an interval above a threshold, to reduce the energy consumption at the wireless device side. Thus, the wireless communication network may be configured that the second RAT consumes less energy than the first RAT but we can configure the first RAT to consume as little energy as possible as we take care of e.g. paging over the second RAT and that the paging is transmitted over the second RAT when the wireless device 10 is asleep on the first RAT. As the second RAT provides means to reach the wireless device 10 with short delay, the DRX settings on the first RAT may be configured to minimize the energy consumption of the primary RAT rather than balancing energy consumption and reachability. As an example, the connection of the second RAT can be setup with a connection interval of 10 ms and a slave latency of four (4) and the DRX cycle of the first RAT can be set to 2560 ms. Assuming that the wireless device 10 attempts to respond to each connection event packet of the second RAT from the radio network node 12 the expected time to reach the wireless device 10 is 5 ms. In the worst case the wireless device 10 is reached within 50 ms.

Action 801. The radio network node 12 may determine whether the wireless device 10 is within coverage of the second RAT. If e.g. the radio network node 12 transmits a beacon over the second RAT, the wireless device 10 may search for the beacon and report to the radio network node 12 whether it can be detected or not. Or, the wireless device 10 or the radio network node 12 may initiate a connection; if the connection setup is successful the wireless device 10 is obviously within reach also over the second RAT. Yet another option is that the coverage of the second RAT is assessed from measurements on the first RAT. This may be achieved by means of estimating the coverage, e.g. received signal power of the second RAT based on measurements on the first RAT if co-located. If properties like transmit output power, carrier frequency and antenna type are known, it might be possible to estimate if the receiver signal strength of the second RAT, i.e. coverage, is sufficient by correlating it to e.g. Received Signal Strength Indicator (RSSI) of the first RAT.

Action 802. The radio network node 12 may check whether a criterion is fulfilled. The criterion is fulfilled when one or more of the following are fulfilled: the load or utilization of the first RAT is exceeded; a delay of transmission in the first RAT is exceeded; the wireless device 10 is within a coverage of the second RAT; the wireless device 10 is capable of supporting the second RAT.

Action 803. The radio network node 12 determines to transmit data associated with the first RAT using the second RAT when the criterion is fulfilled or met. High load or utilization leads to a scheduling delay due to queuing in the scheduler and thus this may indicate that it is beneficial to use the second RAT for e.g. a wake up order such as a paging message to the wireless device 10. The delay may be an estimated delay. This corresponds to action 603 in FIG. 6.

Action 804. The radio network node 12 triggers the transmission of the data to the wireless device 10 using the second RAT. The radio network node 12 may transmit the data or send an activation message to e.g. a radio remote unit in case the access points are not co-located. The data may be transmitted over the second RAT when the wireless device 10 is in a Sleep state in the first RAT. Sleep state may alternatively be defined as an inactive or idle state or a Dormant mode. Dormant mode is a hybrid mode/state between connected Mode and idle Mode, where e.g. an S1 connection is kept. Once the configuration, in action 800, is completed, the radio network node 12 may thus use the second RAT to reach out to the wireless device 10 during periods when the wireless device 10 is in DRX sleep mode. In one embodiment the radio network node 12 transmits a command of the first RAT directly over the second RAT. In another embodiment the radio network node 12 uses the second RAT to transmit the wake-up order to the wireless device 10 forcing it to leave DRX Sleep mode and enter DRX Active mode; making it reachable by means of normal control signaling of the first RAT. This corresponds to action 604 in FIG. 6.

Action 805. The radio network node 12 may obtain an indication of lost connection of the second RAT for the wireless device 10. This indication may be obtained by receiving a message indicating lost connection or by detecting that "keep alive" messages are not received or acknowledged, or that some timer expires.

Action 806. The radio network node 12 may then adjust one or more DRX parameters of the first RAT based on the obtained indication. E.g. the radio network node 12 may adjust the DRX cycle to a short DRX cycle with an interval below a threshold. If the second RAT is configured such that a connection is established, the radio network node 21 may further use the connection to assess the quality of the second RAT. As long as the connection of the second RAT is active the radio network node 12 knows that it can reach the wireless device over the second RAT. If the connection is dropped, or if the measurements indicate that the connection of the second RAT is slowly degrading and will likely soon be dropped, the radio network node 12 may pro-actively reconfigure DRX settings to account for the fact that the wireless device no longer can be reached over the second RAT.

Figure 9:
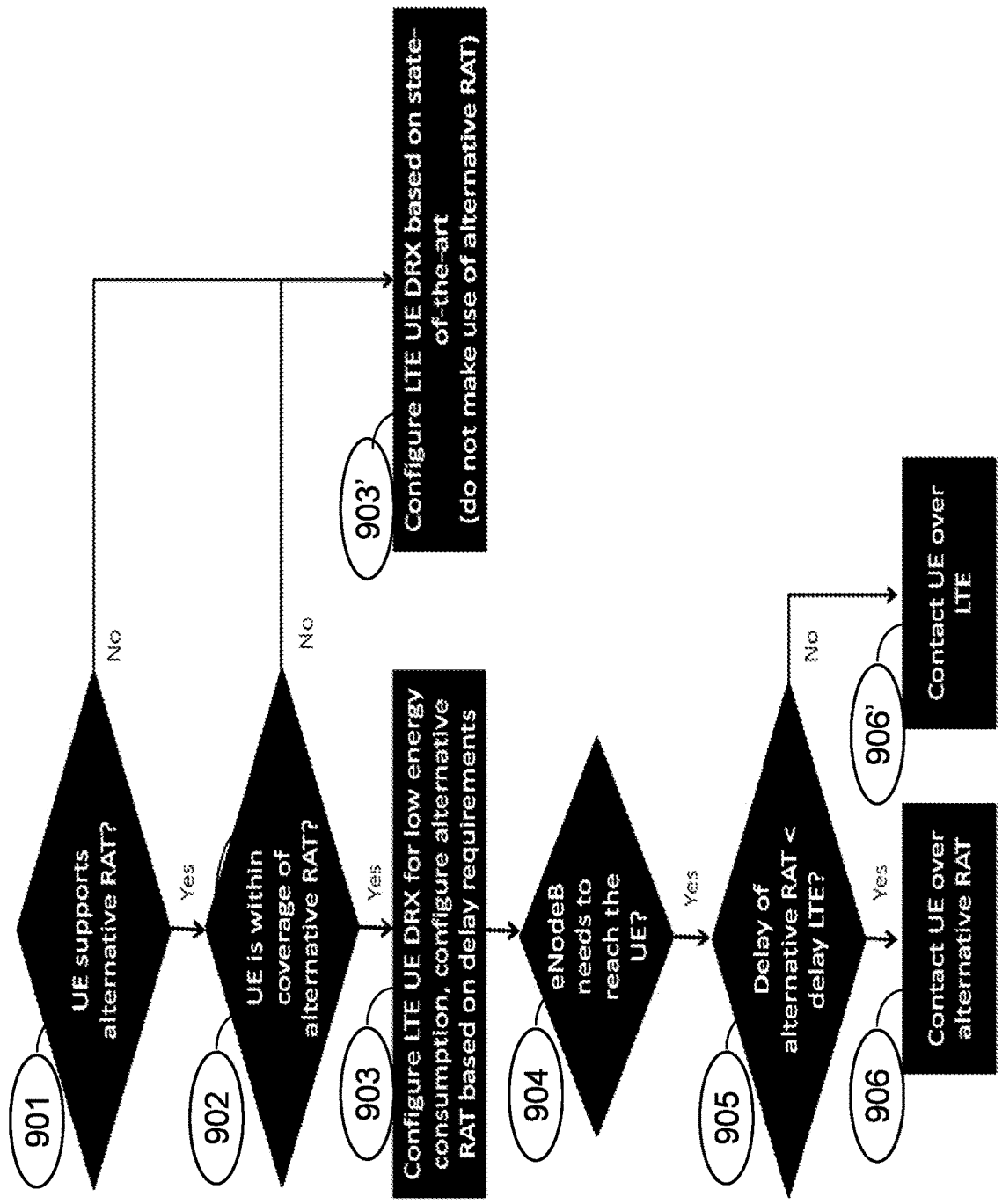
FIG. 9 is a schematic flowchart depicting a method performed by a radio network node according to embodiments herein.

The flowchart in FIG. 9 depicts an exemplary overall procedure at the radio network node 12.

Action 901. The radio network node 12 decides whether the wireless device 10, denoted as UE, supports the alternative RAT, i.e. the second RAT.

Action 902. In that case the radio network node 12 determines whether the wireless device 10 is within coverage of the second RAT.

Action 903. That being the case, the radio network node 12 may configure the first RAT, e.g. configure the LTE DRX for low energy consumption, and the second RAT based on delay requirements e.g. configure the second RAT to page the wireless device 10 without delay or, if a persistent connection between the wireless device and the network is utilized over the second RAT, configure the connection over the second RAT to be associated with low delay. In BLE a low delay is achieved by configuring the connection to use a short connection interval. The wireless device 10 may scan the advertisement channels such that the radio network node 12 can reach the wireless device 10 over the advertisement channels. The advertisement procedure can be executed without delay, and if the data transmission happens as part of the advertisement that is also immediate. Another variant of this is to use the advertisement channels to set up a connection between the radio network node 12 and the wireless device 10 and transfer the data in the connection; then, the data will be transferred with a short delay (advantage with using a connection is that you get the data acknowledged, which is not the case if the data is transmitted over the advertisement channels). Yet another alternative is to set up and maintain a persistent connection between the radio network node 12 and the wireless device 10.

Action 903'. In case the wireless device 10 does not support the second RAT or in case the wireless device 10 is out of coverage of the second RAT, the radio network node 12 may configure the first RAT for all communication, e.g. configure LTE DRX based on state of the art and do not make use of the second RAT.

Action 904. The radio network node 12, denoted as eNodeB, may then determine whether there is a need to reach the wireless device 10, e.g. in case the radio network node 12 has or receives, from another network node, data for the wireless device 10.

Action 905. The radio network node 12 may then estimate delay of transmission using the first RAT and the second RAT and then compare the estimated delays. The option in action 905 could be optional, however, in situations in which the radio network node 12 may reach the wireless device 10 over e.g. LTE within short time, i.e., when the wireless device 10 is or will soon switch to LTE DRX Active state it may be as beneficial from a delay/latency perspective to access the wireless device 10 over LTE as to invoke the second RAT in the procedure.

Action 906. When the delay is shorter using the second RAT the wireless device 10 is contacted over the second RAT.

Action 907. When the delay is equal or longer using the second RAT the wireless device 10 is contacted over the first RAT.

Figure 10:
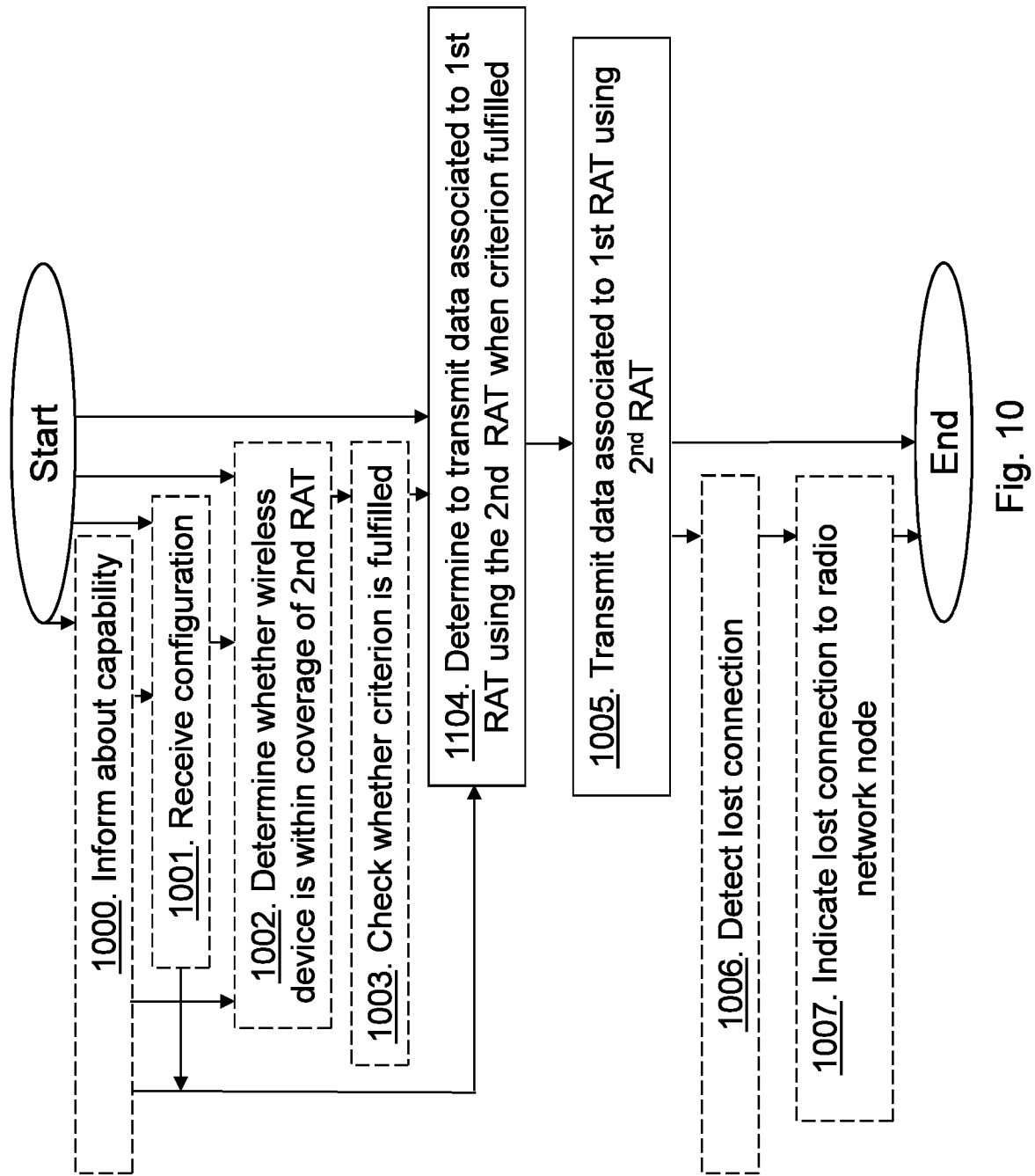
FIG. 10 is a schematic flowchart depicting a method performed by a wireless device according to embodiments herein.

The method actions performed by the wireless device 10 for handling communication of data to the radio network node 12 in the wireless communication network 1 according to some embodiments will now be described with reference to a flowchart depicted in FIG. 10. The actions do not have to be taken in the order stated below, but may be taken in any suitable order. Actions performed in some embodiments are marked with dashed boxes. The first RAT may use a licensed frequency band and the second RAT may use an unlicensed frequency band. Furthermore, the wireless device 10 may consume less energy per time unit using the second RAT than using the first RAT. The first RAT may e.g. comprise LTE access or 5G access and second RAT may comprise Bluetooth Low Energy access. The data may be control data, e.g. control data in UL, regarding a transmission using the first RAT, e.g. the data may be a scheduling request from the wireless device 10 or a feedback data of data transmitted from the radio network node 12 to the wireless device 10.

Action 1000. The wireless device 10 may inform the radio network node 12 about capability of supported RATs of the wireless device 10. The wireless device 10 may inform the radio network node 12 about capability of supporting receiving control information over the second RAT. This corresponds to action 601 in FIG. 6.

Action 1001. The wireless device 10 may receive configuration information from the radio network node 12 for configuring the first RAT for a minimal energy consumption in the wireless device 10, and the second RAT to fulfill a delay requirement.

Action 1002. The wireless device 10 may determine whether the wireless device 10 is within coverage of the second RAT. This corresponds to action 701 in FIG. 7.

Action 1003. The wireless device 10 may then check whether the criterion is fulfilled. The criterion may be fulfilled when one or more of the following are fulfilled: a delay of transmission in the first RAT is exceeded; the wireless device 10 is within the coverage of the second RAT; the wireless device 10 is capable of supporting the second RAT.

Action 1004. The wireless device 10 determines to transmit data associated with the first RAT using the second RAT when the criterion is fulfilled. This corresponds to action 702 in FIG. 7.

Action 1005. The wireless device 10 then transmits the data to the radio network node 12 using the second RAT. This corresponds to action 703 in FIG. 7. The wireless device 10 may transmit the data over the second RAT when the wireless device 10 is in a Sleep state in the first RAT.

Action 1006. The wireless device 10 may detect that a connection over the second RAT is lost.

Action 1007. The wireless device 10 may then indicate to the radio network node 12, that the connection of the second RAT is lost for the wireless device 10. Hence, the wireless device 10 may then be configured with adjusted DRX parameter from the radio network node 12.

Figure 11:
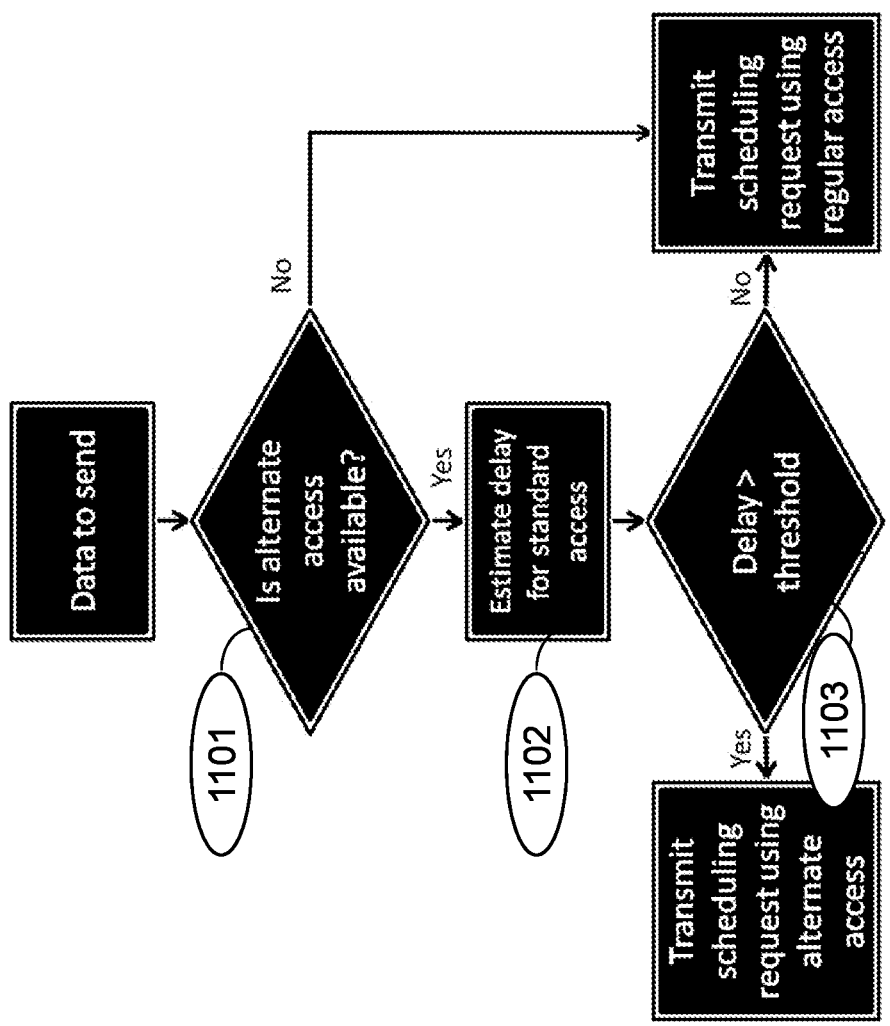
FIG. 11 is a schematic flowchart depicting a method performed by a wireless device according to embodiments herein.

FIG. 11 describes an exemplary flowchart of choosing which access technology to use to transmit a scheduling request for transmitting data performed by the wireless device 10.

Action 1101. The wireless device 10 determines whether the second RAT is available. If not the wireless device 10 transmits the scheduling request using the first RAT, also denoted as regular access.

Action 1102. That being the case, the wireless device 10 may estimate delay of the first RAT, also denoted as standard access.

Action 1103. The wireless device compares the estimated delay with a threshold value. In case the delay is longer than the threshold the wireless device 10 transmits the scheduling request using the second RAT. In case the delay is equal or below the threshold the wireless device 10 transmits the scheduling request using the first RAT.

Figure 12:
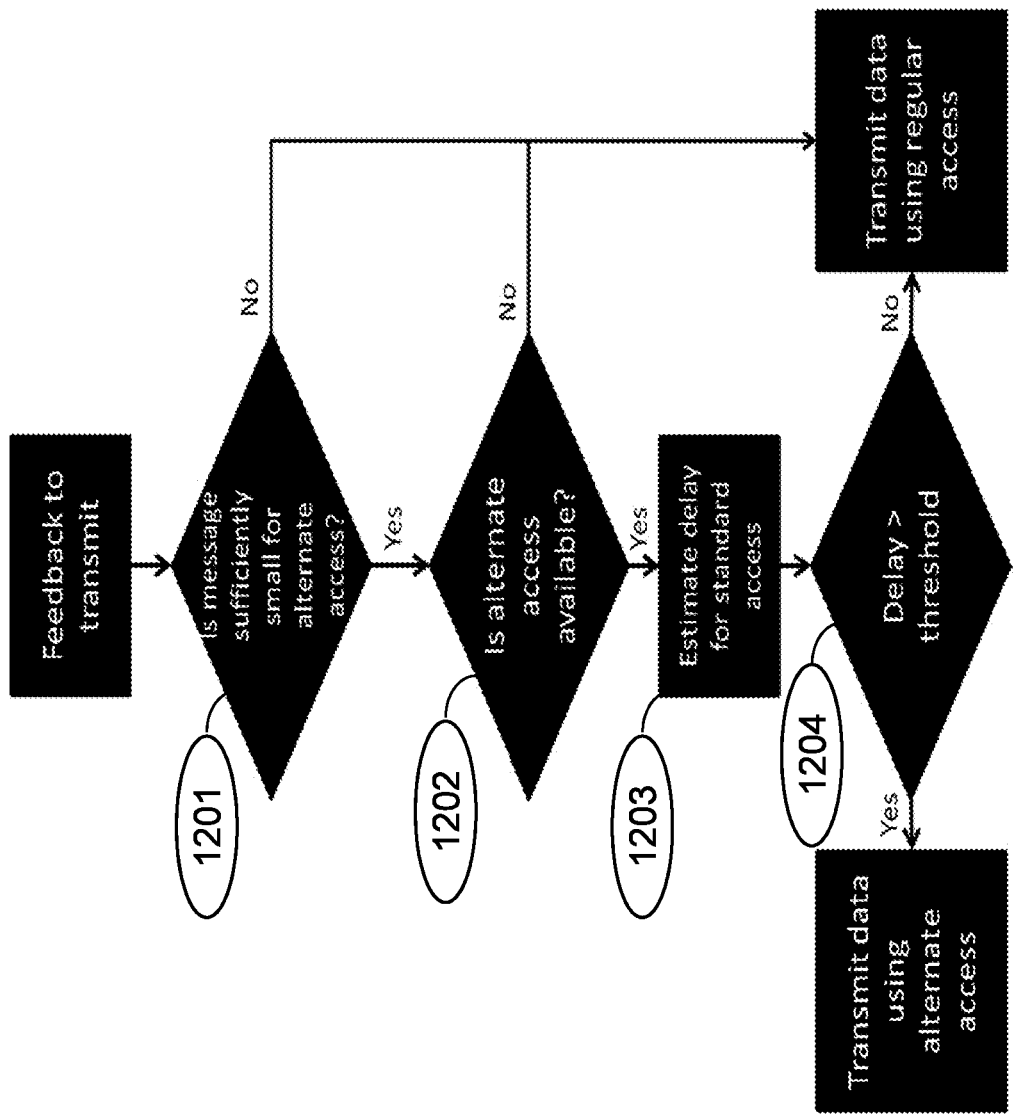
FIG. 12 is a schematic flowchart depicting a method performed by a wireless device according to embodiments herein.

FIG. 12 shows a flowchart describing an embodiment of how to determine if user data, such as feedback data of a transmission from the radio network node 12, shall be transmitted over the second RAT. By sending feedback, e.g., TCP ACKs via an alternate access technology, it is possible to reduce the amount of feedback data in the primary RAT, allowing for a larger number of wireless devices to be multiplexed in the same subframe.

Action 1201. The wireless device 10 determines whether the message or feedback is sufficiently small for the second RAT. E.g. whether the feedback packet smaller than a pre-set size threshold. If not the wireless device 10 transmits the feedback using the first RAT, also denoted as regular access.

Action 1202. The wireless device 10 determines whether the second RAT is available. If not the wireless device 10 transmits the feedback using the first RAT.

Action 1203. That being the case, the wireless device 10 may estimate delay of the first RAT, also denoted as standard access.

Action 1204. The wireless device compares the estimated delay with a threshold value. In case the delay is longer than the threshold the wireless device 10 transmits the feedback using the second RAT. In case the delay is equal or below the threshold the wireless device 10 transmits the feedback using the first RAT.

Figure 13:
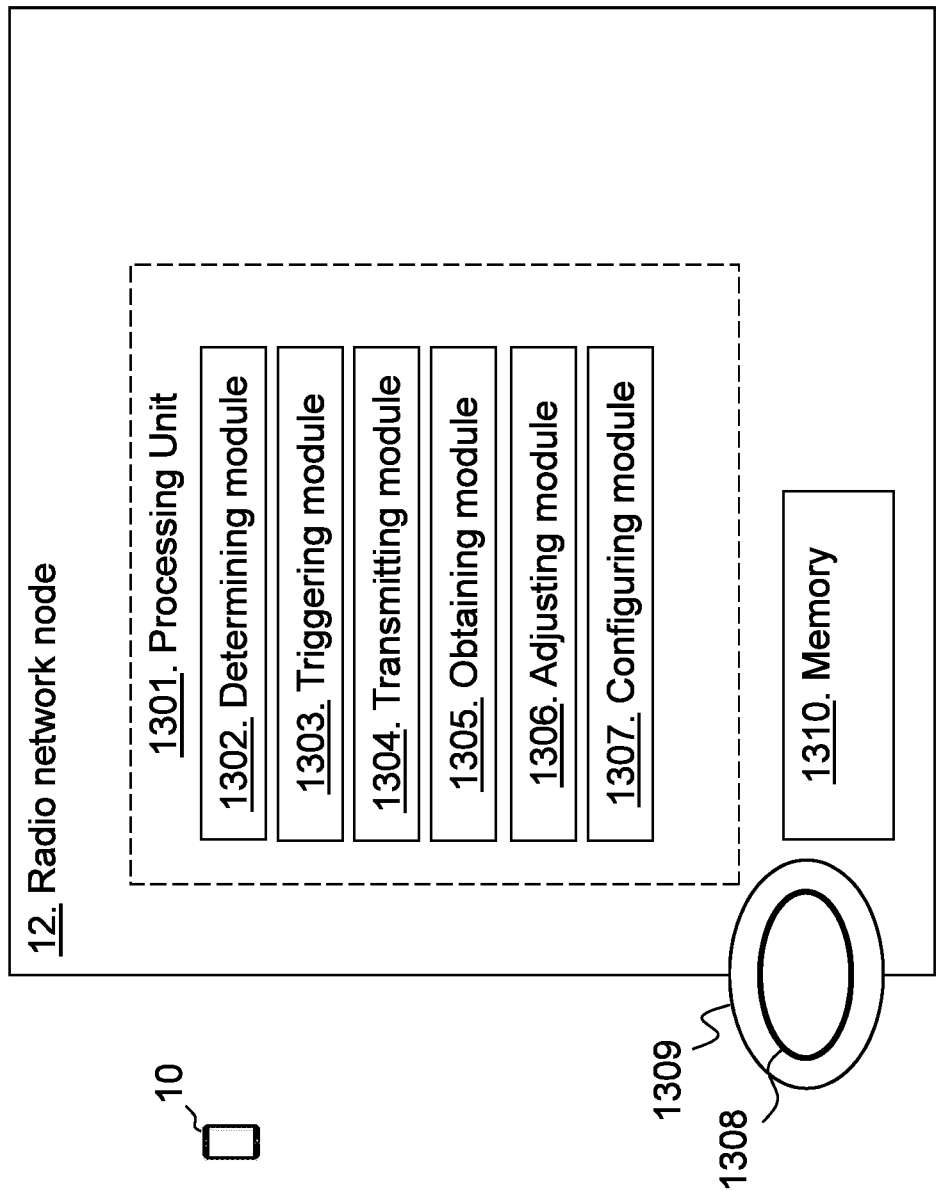
FIG. 13 is a block diagram depicting a radio network node according to embodiments herein.

FIG. 13 is a block diagram depicting the radio network node 12 for handling communication of data to the wireless device 10 in the wireless communication network 1. The first RAT may be using a licenced frequency band and the second RAT may be using an unlicensed frequency band. The wireless device 10 consumes, or may be configured to consume, less energy per time unit using the second RAT than using the first RAT. The first RAT may comprise LTE access or 5G access and the second RAT may comprise Bluetooth Low Energy access. The data may be control data regarding a transmission using the first RAT. For example, the data may be the wake up order, a paging message, to the wireless device 10 for receiving data over the first RAT or the feedback data of data transmitted from the wireless device 10 to the radio network node 12.

The radio network node 12 comprises a processing unit 1301, e.g. one or more processors, configured to perform the methods herein.

The radio network node 12 may comprise a determining module 1302. The radio network node 12, the processing unit 1301, and/or the determining module 1302 may be configured to determine to transmit data associated with the first RAT using the second RAT when the criterion is fulfilled. The criterion may be fulfilled when one or more of the following are fulfilled: the load or utilization of the first RAT is exceeded; the delay of transmission in the first RAT is exceeded; the wireless device 10 is within the coverage of the second RAT; the wireless device 10 is capable of supporting the second RAT.

The radio network node 12 may comprise a triggering module 1303. The radio network node 12, the processing unit 1301, and/or the triggering module 1303 may be configured to trigger the transmission of the data to the wireless device 10 using the second RAT.

The radio network node 12 may comprise a transmitting module 1304. The radio network node 12, the processing unit 1301, and/or the transmitting module 1304 may be configured to transmit the data over the second RAT when the wireless device 10 is in the Sleep state in the first RAT.

The radio network node 12, the processing unit 1301, and/or the determining module 1302 may be configured to determine whether the wireless device 10 is within coverage of the second RAT. Then the radio network node 12, the processing unit 1301, and/or the determining module 1302 may be configured to check whether the criterion is fulfilled.

The radio network node 12 may comprise an obtaining module 1305. The radio network node 12, the processing unit 1301, and/or the obtaining module 1305 may be configured to obtain the indication of lost connection of the second RAT for the wireless device 10.

The radio network node 12 may comprise an adjusting module 1306. The radio network node 12, the processing unit 1301, and/or the adjusting module 1306 may be configured to adjust one or more DRX parameters of the first RAT based on the obtained indication.

The radio network node 12 may comprise a configuring module 1307. The radio network node 12, the processing unit 1301, and/or the configuring module 1307 may be configured to configure the first RAT for a minimal energy consumption in the wireless device 10, and the second RAT to fulfill a delay requirement.

The methods according to the embodiments described herein for e.g. the radio network node 12 are respectively implemented by means of e.g. a computer program 1308 or a computer program product, comprising instructions, i.e., software code portions, which, when executed on at least one processor, cause the at least one processor to carry out the actions described herein, as performed by the radio network node 12. The computer program 1308 may be stored on a computer-readable storage medium 1309, e.g. a disc or similar. The computer-readable storage medium 1309, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

The radio network node 12 further comprises a memory 1310. The memory comprises one or more units to be used to store data on, such as DRX cycles, DRX cycle state or DRX schemes, configurations of RATs, delay, load, radio coverage, applications to perform the methods disclosed herein when being executed, and similar.

Figure 14:
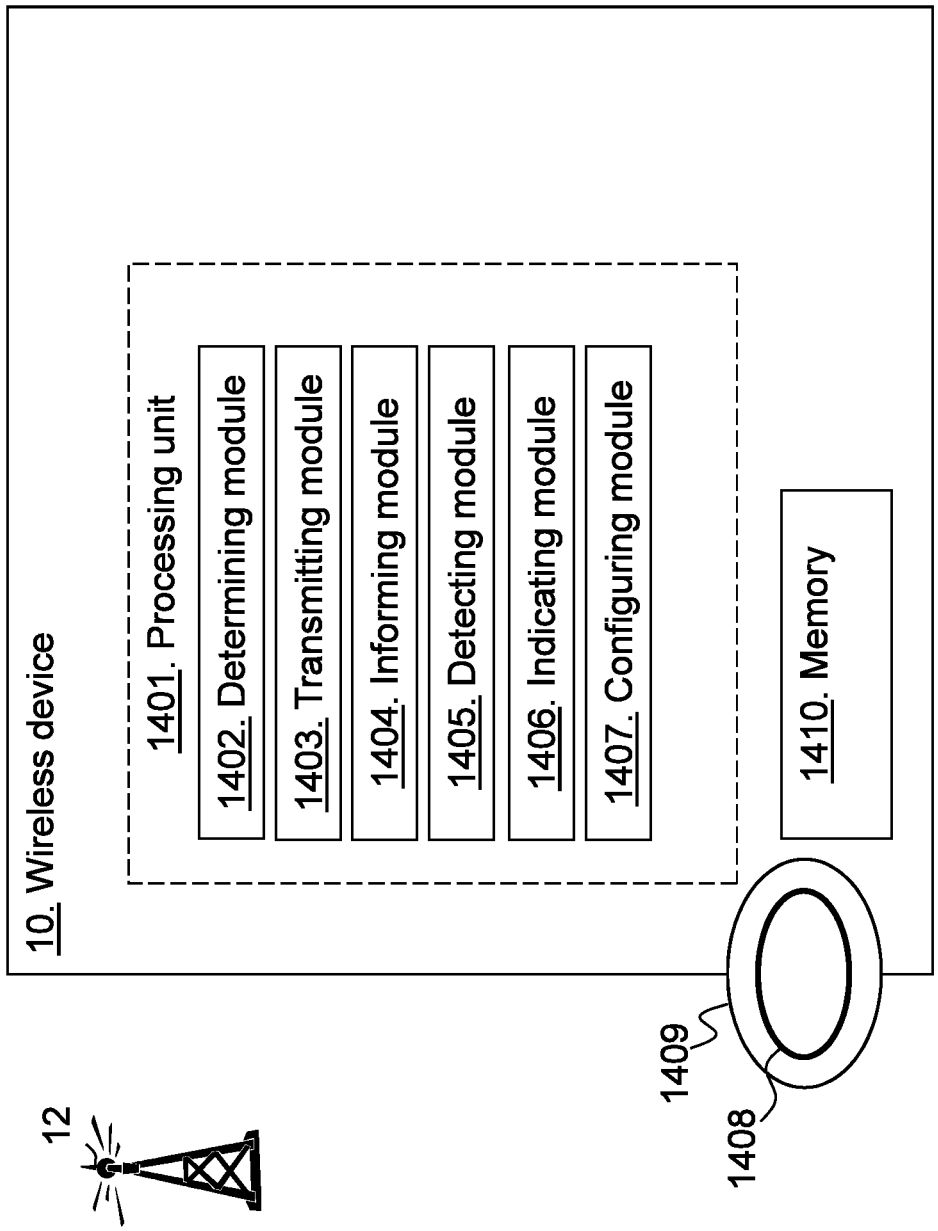
FIG. 14 is a block diagram depicting a wireless device according to embodiments herein.

FIG. 14 is a block diagram depicting the wireless device 10 for handling communication of data to the radio network node 12 in the wireless communication network 1. The first RAT may be using a licenced frequency band and the second RAT may be using an unlicensed frequency band. The wireless device 10 consumes, or may be configured to consume, less energy per time unit using the second RAT than using the first RAT. The first RAT may comprise LTE access or 5G access and the second RAT may comprise Bluetooth Low Energy access. The data may be control data regarding a transmission using the first RAT. For example, the data may be the scheduling request from the wireless device 10 or the feedback data of data transmitted from the radio network node 12 to the wireless device 10.

The wireless device 10 comprises a processing unit 1401, e.g. one or more processors, configured to perform the methods herein.

The wireless device 10 may comprise a determining module 1402. The wireless device 10, the processing unit 1401, and/or the determining module 1402 may be configured to determine to transmit data associated with the first RAT using the second RAT when the criterion is fulfilled. The criterion may be fulfilled when one or more of the following are fulfilled: a delay of transmission in the first RAT is exceeded; the wireless device 10 is within a coverage of the second RAT; the wireless device 10 is capable of supporting the second RAT. The wireless device 10, the processing unit 1401, and/or the determining module 1402 may be configured to determine whether the wireless device 10 is within coverage of the second RAT; and to check whether the criterion is fulfilled.

The wireless device 10 may comprise a transmitting module 1403. The wireless device 10, the processing unit 1401, and/or the transmitting module 1403 may be configured to transmit the data to the radio network node 12 using the second RAT. The wireless device 10, the processing unit 1401, and/or the transmitting module 1403 may be configured to transmit the data over the second RAT when the wireless device 10 is in the Sleep state in the first RAT.

The wireless device 10 may comprise an informing module 1404. The wireless device 10, the processing unit 1401, and/or the informing module 1404 may be configured to inform the radio network node 12 about capability of supported RATs of the wireless device 10. The wireless device 10, the processing unit 1401, and/or the informing module 1404 may be configured to inform the radio network node 12 about capability of supporting receiving control information over the second RAT.

The wireless device 10 may comprise a detecting module 1405. The wireless device 10, the processing unit 1401, and/or the detecting module 1405 may be configured to detect that the connection over the second RAT is lost.

The wireless device 10 may comprise an indicating module 1406. The wireless device 10, the processing unit 1401, and/or the indicating module 1406 may be configured to indicate to the radio network node 12, that the connection of the second RAT is lost for the wireless device 10.

The wireless device 10 may comprise a configuring module 1407. The wireless device 10, the processing unit 1401, and/or the configuring module 1407 may be configured to receive configuration information from the radio network node for configuring the first RAT for a minimal energy consumption in the wireless device 10, and the second RAT to fulfill a delay requirement.

The methods according to the embodiments described herein for e.g. the wireless device 10 are respectively implemented by means of e.g. a computer program 1408 or a computer program product, comprising instructions, i.e., software code portions, which, when executed on at least one processor, cause the at least one processor to carry out the actions described herein, as performed by the wireless device 10. The computer program 1408 may be stored on a computer-readable storage medium 1409, e.g. a disc or similar. The computer-readable storage medium 1409, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 further comprises a memory 1410. The memory comprises one or more units to be used to store data on, such as DRX cycles, DRX cycle state or DRX schemes, configurations of RATs, delay, load, radio coverage, capability, applications to perform the methods disclosed herein when being executed, and similar.

Figure 15:
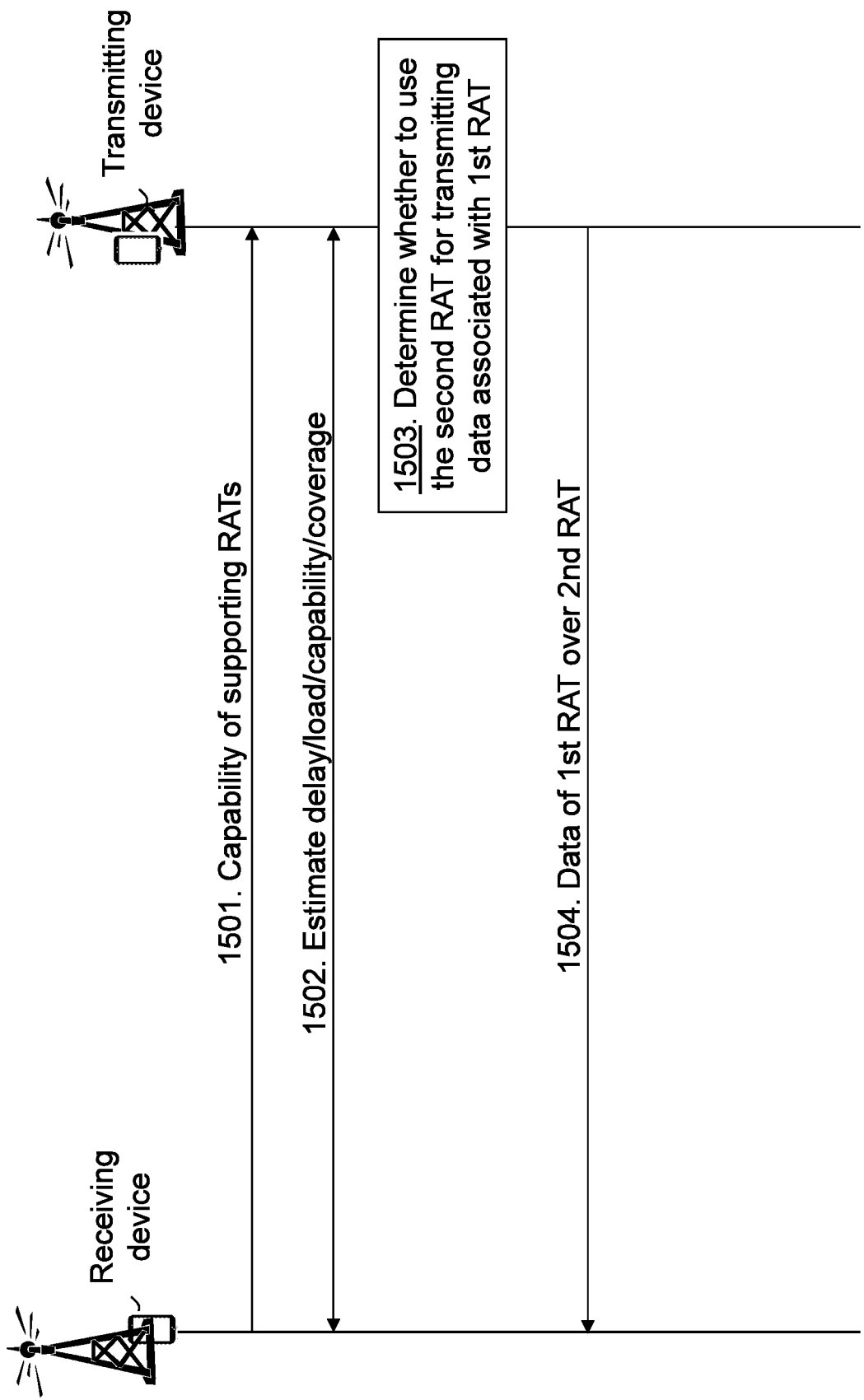
FIG. 15 is a combined flowchart and signalling scheme according to embodiments herein.

Thus, embodiments herein may relate to a transmitting device, such as the wireless device 10 or the radio network node 12, and a receiving device, such as the radio network node 12 or the wireless device 10 as shown in FIG. 15.

Action 1501. The receiving device may report capability to the transmitting device informing the transmitting device about capability of supported RATs of the receiving device. The receiving device may inform the transmitting device about its capabilities including if it supports any or the alternative second RAT, and if it supports receiving (downlink) control information over the alternative second RAT.

Action 1502. The receiving device and/or the transmitting device may then estimate delay of the first RAT, load in the first RAT, and/or determine capability of the receiving device. Furthermore, the transmitting device may assess whether the receiving device is within coverage also for the alternative second RAT.

Action 1503. The transmitting device then determines whether to use the second RAT for transmitting data associated with the first RAT. If the receiving device does not support any or the second RAT, or if the range of the alternative second RAT is insufficient, the transmitting device may configure the first RAT, e.g. DRX parameters, according to today's state of the art procedures. However, if the receiving device does support the second RAT and if the receiving device is within reach also over the second RAT, the transmitting device when configuring the first RAT parameters may also configure the second RAT to be used for e.g. paging or similar.

Action 1504. The transmitting device then triggers the transmission of the data associated with the first RAT, to the receiving device, using the second RAT when the condition is fulfilled and thereby achieving the objective of minimizing the energy consumption and the latency in the wireless communication network. Hence, the receiving device receives data associated with the first RAT over the second RAT.

As will be readily understood by those familiar with communications design, that function modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes and wireless devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling communication of data to a wireless device in a wireless communication network, the method comprising:
   determining to transmit data associated with a first radio access technology (RAT) using a second RAT when a criterion is fulfilled;
   triggering a transmission of the data to the wireless device using the second RAT;
   obtaining an indication of a lost connection of the second RAT for the wireless device; and
   adjusting one or more Discontinuous Reception (DRX) parameters used by the wireless device for the first RAT based on the obtained indication.

2. A method performed by a wireless device for handling communication of data to a radio network node in a wireless communication network, the method comprising:
   determining to transmit data associated with a first radio access technology (RAT) using a second RAT when a criterion is fulfilled;
   transmitting the data to the radio network node using the second RAT;
   detecting that a connection over the second RAT is lost; and
   indicating to the radio network node, that the connection of the second RAT is lost for the wireless device.

3. A radio network node configured for handling communication of data to a wireless device in a wireless communication network, the radio network node comprising:
   processing circuitry; and
   a memory having stored thereon a computer program comprising instructions that, when executed on the processing circuitry, cause the radio network node to:
   determine to transmit data associated with a first radio access technology (RAT) using a second RAT, when a criterion is fulfilled;
   responsive to the determination, trigger a transmission of the data to the wireless device using the second RAT;
   obtain an indication of a lost connection of the second RAT for the wireless device; and
   adjust one or more Discontinuous Reception (DRX) parameters used by the wireless device for the first RAT based on the obtained indication.

4. The radio network node according to claim 3, wherein the criterion is fulfilled when one or more of the following are fulfilled: a load or utilization of the first RAT is exceeded; a delay of transmission in the first RAT is exceeded; the wireless device is within a coverage of the second RAT; and the wireless device is capable of supporting the second RAT.

5. The radio network node according to claim 3, wherein the data is control data regarding a transmission using the first RAT.

6. The radio network node according to claim 3, wherein the instructions cause the radio network node to transmit the data over the second RAT, via radio circuitry of the radio network node, when the wireless device is in a Sleep state in the first RAT.

7. The radio network node according to claim 3, wherein the instructions cause the radio network node to check whether the criterion is fulfilled in response to determining that the wireless device is within coverage of the second RAT.

8. The radio network node according to claim 3, wherein the instructions cause the radio network node to:
configure the first RAT for minimal energy consumption in the wireless device; and
configure the second RAT to fulfill a delay requirement.

9. The radio network node according to claim 3, wherein the wireless device is configured to consume less energy per time unit using the second RAT than using the first RAT.

10. A wireless device configured for handling communication of data to a radio network node in a wireless communication network, comprising:
processing circuitry; and
a memory having stored thereon a computer program comprising instructions that, when executed on the processing circuitry, cause the wireless device to:
determine to transmit data associated with a first radio access technology (RAT) using a second RAT, when a criterion is fulfilled;
responsive to the determination, transmit the data to the radio network node using the second RAT;
detect that a connection over the second RAT is lost; and
indicate to the radio network node, that the connection of the second RAT is lost for the wireless device.

11. The wireless device according to claim 10, wherein the criterion is fulfilled when one or more of the following are fulfilled: a delay of transmission in the first RAT is exceeded; the wireless device is within a coverage of the second RAT; and the wireless device is capable of supporting the second RAT.

12. The wireless device according to claim 10, wherein the data is control data regarding a transmission using the first RAT.

13. The wireless device according to claim 10, wherein the instructions cause the wireless device to transmit the data, via radio circuitry of the wireless device, over the second RAT, when the wireless device is in a Sleep state in the first RAT.

14. The wireless device according to claim 10, wherein the instructions cause the wireless device to inform the radio network node about capability of supported RATs of the wireless device.

15. The wireless device according to claim 10, wherein the instructions cause the wireless device to inform the radio network node about a capability of supporting reception of control information over the second RAT.

16. The wireless device according to claim 10, wherein the instructions cause the wireless device to check whether the criterion is fulfilled in response to determining that the wireless device is within coverage of the second RAT.

17. The wireless device according to claim 10, wherein the instructions cause the wireless device to receive, via radio circuitry of the wireless device, configuration information from the radio network node, for configuring the first RAT for minimal energy consumption in the wireless device, and for configuring the second RAT to fulfill a delay requirement.

18. The wireless device according to claim 10, wherein the instructions cause the wireless device to consume less energy per time unit using the second RAT than using the first RAT.

* * * * *